(12) United States Patent
Ezati et al.

(10) Patent No.: US 12,709,331 B1
(45) Date of Patent: Aug. 18, 2026

(54) SYSTEMS AND METHODS FOR PREVENTING SIDE COLLISIONS

(71) Applicant: GM GLOBAL TECHNOLOGY OPERATIONS LLC, Detroit, MI (US)

(72) Inventors: Mahdokht Ezati, Pickering (CA); Avesta Goodarzi, Whitby (CA); Hojjat Izadi, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/083,605

(22) Filed: Mar. 19, 2025

(51) Int. Cl.
*B62D 15/02* (2006.01)
*B62D 6/00* (2006.01)

(52) U.S. Cl.
CPC ......... *B62D 15/0265* (2013.01); *B62D 6/002* (2013.01)

(58) Field of Classification Search
CPC ............................ B62D 15/0265; B62D 6/002
USPC ......................................... 701/41, 42, 43, 44
See application file for complete search history.

(56) References Cited

U.S. PATENT DOCUMENTS 10,077,045 B2 * 9/2018 Kiyokawa ............ G05D 1/0212
10,604,185 B2 * 3/2020 Benmimoun ........ G05D 1/0212
12,110,055 B1 * 10/2024 Parkila ................. B62D 15/028
2016/0280263 A1 * 9/2016 Mori .................... B62D 15/027

FOREIGN PATENT DOCUMENTS

DE 102017119605 A1 3/2018
DE 102023128482 A1 11/2024

OTHER PUBLICATIONS

German Office Action from counterpart DE1020251176191, dated Nov. 24, 2025.

* cited by examiner

*Primary Examiner* — Hai H Huynh

(57) ABSTRACT

A steering system for a vehicle includes a steering input device configured to control a steering angle, a gear selector, front wheels positioned at a road wheel angle, and a plurality of sensors. A processing module is configured to determine one or more distances between the vehicle and one or more obstacles in response to the plurality of sensors. A driver assistance module is configured to generate a predetermined collision angle. A controller includes a steering control module configured to when the gear selector is in forward, determine a first maximum road wheel angle using a first equation and a second maximum road wheel angle using a second equation based on the one or more distances and set a maximum allowable road wheel angle to a smallest angle of the first and second maximum road wheel angles. The steering control module selectively performs a remedial action.

20 Claims, 8 Drawing Sheets

SYSTEMS AND METHODS FOR PREVENTING SIDE COLLISIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles, and more particularly to vehicles including a steering control system configured to prevent side collisions.

Some vehicles include a mechanical steering system that includes a steering wheel that is mechanically coupled to front wheels of the vehicle. Other vehicles include steer-by-wire systems that include a steering input device that is not mechanically connected to the front wheels of the vehicle. The steering input device includes a steering wheel, yoke, joystick, etc. that is connected to a steering controller that electronically controls a road wheel actuator to turn the front wheels from side-to-side to steer the vehicle. Steering can be performed by the driver or a driver assistance system.

SUMMARY

A steering system for a vehicle includes a steering input device configured to control a steering angle, a gear selector, front wheels positioned at a road wheel angle, and a plurality of sensors. A processing module is configured to determine one or more distances between the vehicle and one or more obstacles in response to the plurality of sensors. A driver assistance module is configured to generate a predetermined collision angle. A controller includes a steering control module configured to when the gear selector is in forward, determine a first maximum road wheel angle using a first equation and a second maximum road wheel angle using a second equation based on the one or more distances and set a maximum allowable road wheel angle to a smallest angle of the first maximum road wheel angle and the second maximum road wheel angle. The steering control module selectively performs a remedial action in response to the steering angle, the maximum allowable road wheel angle, and the predetermined collision angle.

In other features, the controller is configured to, when the gear selector is in reverse, determine a third maximum road wheel angle using a third equation and a fourth maximum road wheel angle using a fourth equation based on the one or more distances and set a maximum allowable road wheel angle to a smallest angle of the third maximum road wheel angle and the fourth maximum road wheel angle.

In other features, the steering input device is physically connected to the front wheels of the vehicle. The steering input device is not physically connected to the front wheels of the vehicle.

In other features, a road wheel actuator is configured to adjust the road wheel angle of the front wheels of the vehicle in response to the steering control module. The driver assistance module is further configured to generate a driver assistance angle. The remedial action includes a first remedial action performed when an absolute value of a difference between the steering angle and the maximum allowable road wheel angle is less than or equal to the predetermined collision angle. The first remedial action includes setting the road wheel angle equal to the maximum allowable road wheel angle.

In other features, the remedial action includes a second remedial action performed when an absolute value of a difference between the steering angle and the maximum allowable road wheel angle is greater than the predetermined collision angle and less than a driver assist angle. The second remedial action includes lowering a steering ratio of the steering input device.

In other features, the first equation and second equation, respectively, are as follows:

$$d_b = \sqrt{l_o^2 + \left(\frac{I_b}{\tan\theta} + w\right)^2} - \left(\sqrt{l_o^2 + \left(\frac{I_b}{\tan\theta} + w\right)^2} \times \cos\left(\sin^{-1}\left(\frac{l_o}{\sqrt{l_o^2 + \left(\frac{I_b}{\tan\theta} + w\right)^2}}\right) - \psi\right)\right)$$

$$d_f = \sqrt{\left(\frac{I_b}{\tan\theta} - w\right)^2 + [\![(I]\!]_b + l_f)^2} \times \sin\left(90 - \tan^{-1}\left(\frac{I_b + l_f}{\frac{I_b}{\tan\theta} - w}\right) - \psi\right) + \sqrt{\left(\frac{I_b}{\tan\theta} - w\right)^2 + [\![(I]\!]_b + l_f)^2} \times \sin\left(\sin^{-1}\left(\frac{l_o}{\sqrt{l_o^2 + \left(\frac{I_b}{\tan\theta} + w\right)^2}}\right) - 90 + \tan^{-1}\left(\frac{I_b + l_f}{\frac{I_b}{\tan\theta} - w}\right)\right)$$

wherein $d_b$ is a distance from a back corner of the vehicle to a first obstacle, $d_f$ is a distance from a front corner of the vehicle to a second obstacle, $l_b$ is length of a wheelbase, $l_f$ is length of a wheel track, w is one half of a rear track width, and $\psi$ is a heading angle.

In other features, the third equation and fourth equation, respectively, are as follows:

$$d_f = \sqrt{(l_b + l_f)^2 + \left(\frac{I_b}{\tan\theta} + w\right)^2} \times \left[1 - \cos\left(\sin^{-1}\left(\left(\frac{l_b + l_f}{\sqrt{(l_b + l_f)^2 + \left(\frac{I_b}{\tan\theta} + w\right)^2}}\right) - \psi\right)\right)\right]$$

$$d_b = \sqrt{\left(\frac{I_b}{\tan\theta} - w\right)^2 + l_o^2} \times \sin\left(90 - \tan^{-1}\left(\frac{l_o}{\frac{I_b}{\tan\theta} - w}\right) - \psi\right) + \sqrt{\left(\frac{I_b}{\tan\theta} -\right.} \times \sin\left(\sin^{-1}\left(\frac{l_o}{\sqrt{l_o^2 + \left(\frac{I_b}{\tan\theta} + w\right)^2}}\right) - 90 + \tan^{-1}\left(\frac{l_o}{\frac{I_b}{\tan\theta} - w}\right)\right)$$

wherein $d_b$ is a distance from a back corner of the vehicle to a first obstacle, $d_f$ is a distance from a front corner of the vehicle to a second obstacle, $l_b$ is length of a wheelbase, $l_f$ is length of a wheel track, w is one half of a rear track width, and $\psi$ is a heading angle.

In other features, the remedial action includes generating at least one of an audible obstacle warning and a visual obstacle warning.

A steering system for a vehicle includes a steering input device configured to control a steering angle, a gear selector, front wheels positioned at a road wheel angle, a road wheel actuator configured to rotate the front wheels of the vehicle, and a plurality of sensors including at least one of a radar sensor, an ultrasound sensor, a lidar sensor, and a camera generating images. A sensor and image processing module is configured to determine one or more distances between the vehicle and one or more obstacles in response to the plurality of sensors. A driver assistance system is configured to generate a predetermined collision angle and a driver assistance angle. A controller includes a steering control module configured to control the road wheel actuator and to, when the gear selector is in forward, determine a first maximum road wheel angle using a first equation and a second maximum road wheel angle using a second equation based on the one or more distances and set a maximum allowable road wheel angle to a smallest angle of the first maximum road wheel angle and the second maximum road wheel angle based on the one or more distances. When the gear selector is in reverse, the steering control module is configured to determine a third maximum road wheel angle using a third equation and a fourth maximum road wheel angle using a fourth equation and set a maximum allowable road wheel angle to a smallest angle of the third maximum road wheel angle and the fourth maximum road wheel angle. The steering control module selectively performs a remedial action in response to the steering angle, the maximum allowable road wheel angle, and the predetermined collision angle.

In other features, the remedial action includes setting the road wheel angle equal to the maximum allowable road wheel angle when an absolute value of a difference between the steering angle and the maximum allowable road wheel angle is less than or equal to the predetermined collision angle. The remedial action includes lowering a steering ratio of the steering input device when an absolute value of a difference between the steering angle and the maximum allowable road wheel angle is greater than the predetermined collision angle and less than a driver assist angle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles with steer-by-wire (SbW) steering systems typically use a steering ratio that is higher at lower vehicle speeds as compared to higher vehicle speeds. For the same steering wheel angle input from the driver, the road wheels rotate more at low speeds than at high speeds. This can result in unintended collisions and damage to the vehicle in tight spaces when the driver inputs an excessive steering wheel angle. Examples of tight spaces include parking in narrow spots in multilevel parking garages, driving through narrow city streets with parked cars on both sides, and/or navigating through narrow lanes and tight corners.

Steering control systems and methods according to the present disclosure prevent side collisions by estimating a maximum allowable road wheel angle using sensory data and vehicle dimensions for forward driving, reversing, and/or stationary scenarios. The steering control systems and methods perform one or more remedial actions to avoid side collisions based on an estimated maximum angle and a road wheel angle command set by the driver.

In some examples, the steering controller limits a road wheel angle and removes driver control if a steering command falls within a side collision range. In other examples, the steering controller actively lowers a steering ratio if the steering command falls within a driver-assist range but greater than a side collision range. In other examples, the steering controller sends an audible or visual driver alert if the steering command exceeds a driver-assist range. In some examples, two or three of the foregoing are combined.

The steering controller improves vehicle maneuverability and provides real-time driver assistance, which reduces stress during parking and low-speed maneuvers. The steering controller provides to cost savings by minimizing damage and repair costs, enhancing the overall driving experience, and/or increasing vehicle longevity by preventing frequent collisions.

Figure 1A:
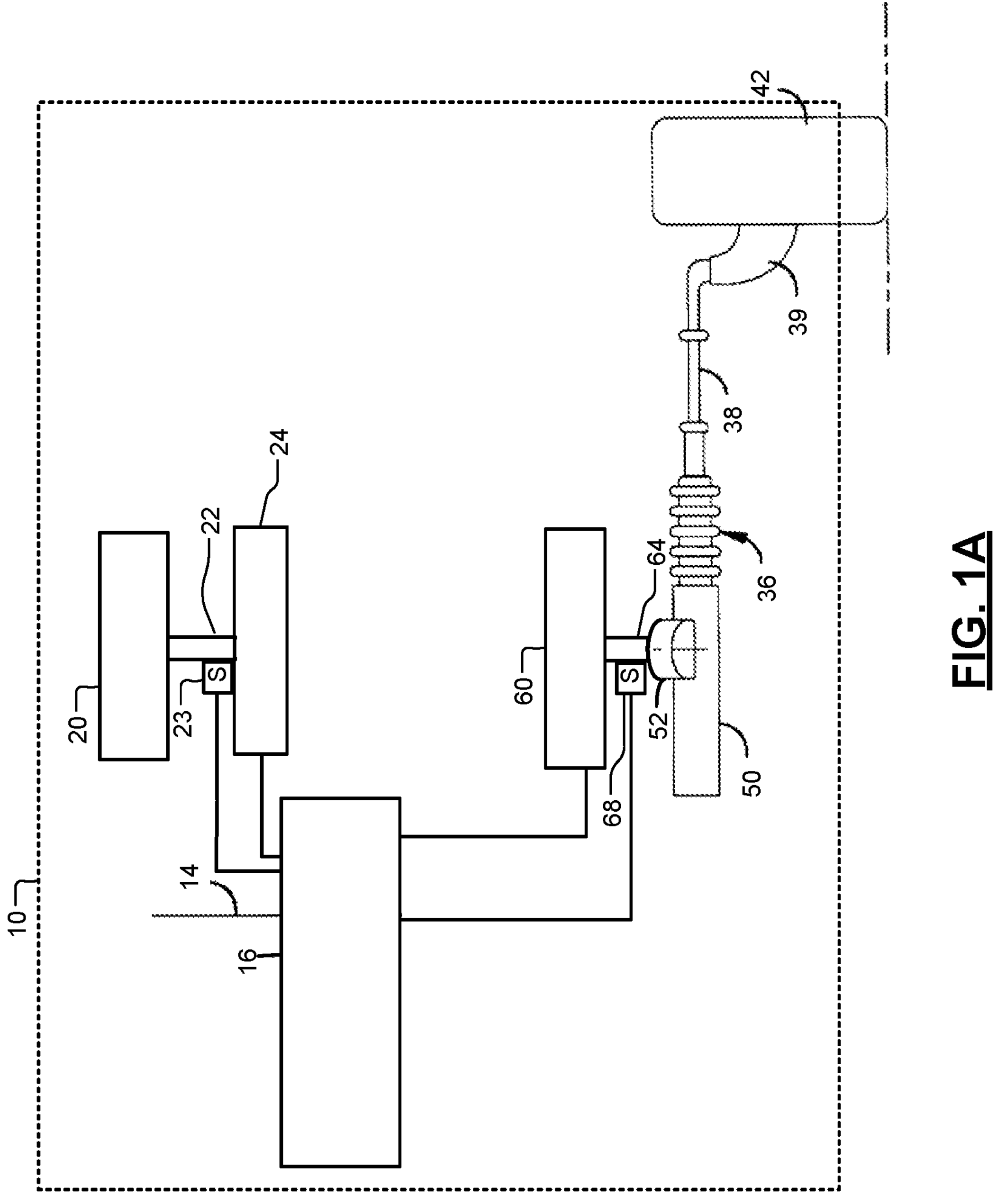
FIG. 1A is a functional block diagram of an example of a steering control system for a vehicle according to the present disclosure.

Referring now to FIG. 1A, a vehicle 10 including a steer-by-wire (SbW) system according to the present disclosure is shown. While a steer-by-wire system is shown, a mechanical steering system can also be used as will be described further below. A steering control module 16 is configured to control a road wheel actuator (RWA) 60 in response to rotation of a steering input device 20 as will be described further below. In some examples, the steering control module 16 receives one or more sensed parameters 14 (such as accelerator pedal position, brake pedal position, vehicle speed, wheel speeds, etc.) received from a vehicle data bus.

A driver of the vehicle provides steering inputs using the steering input device 20. For example, the steering input device 20 may rotate a shaft 22. A sensor 23 senses a rotational angle of the steering input device 20 and/or the shaft 22. In some examples, a feedback motor 24 is configured to control torque felt by the driver as the steering input device 20 is rotated to simulate road feel and/or to provide feedback related to steering ratio changes at high rotational angles.

The vehicle 10 includes a steering mechanism 36 that causes movement of front wheels 42 in response to movement of the steering input device 20. In some examples, the steering mechanism 36 includes a rack-and-pinion system, although other steering systems can be used. The rack-and-pinion system includes a toothed rack (not shown) and a pinion gear (also not shown) located inside rack and gear housings 50 and 52. The RWA 60 is configured to rotate a shaft 64 in response to commands from the steering control module 16. Rotation of the shaft 64 turns the pinion gear. Rotation of the pinion gear moves the rack which moves tie rods 38 connected to steering knuckles 39 and the front wheels 42 (one side shown). A sensor 68 senses an angle of the shaft 64.

Figure 1B:
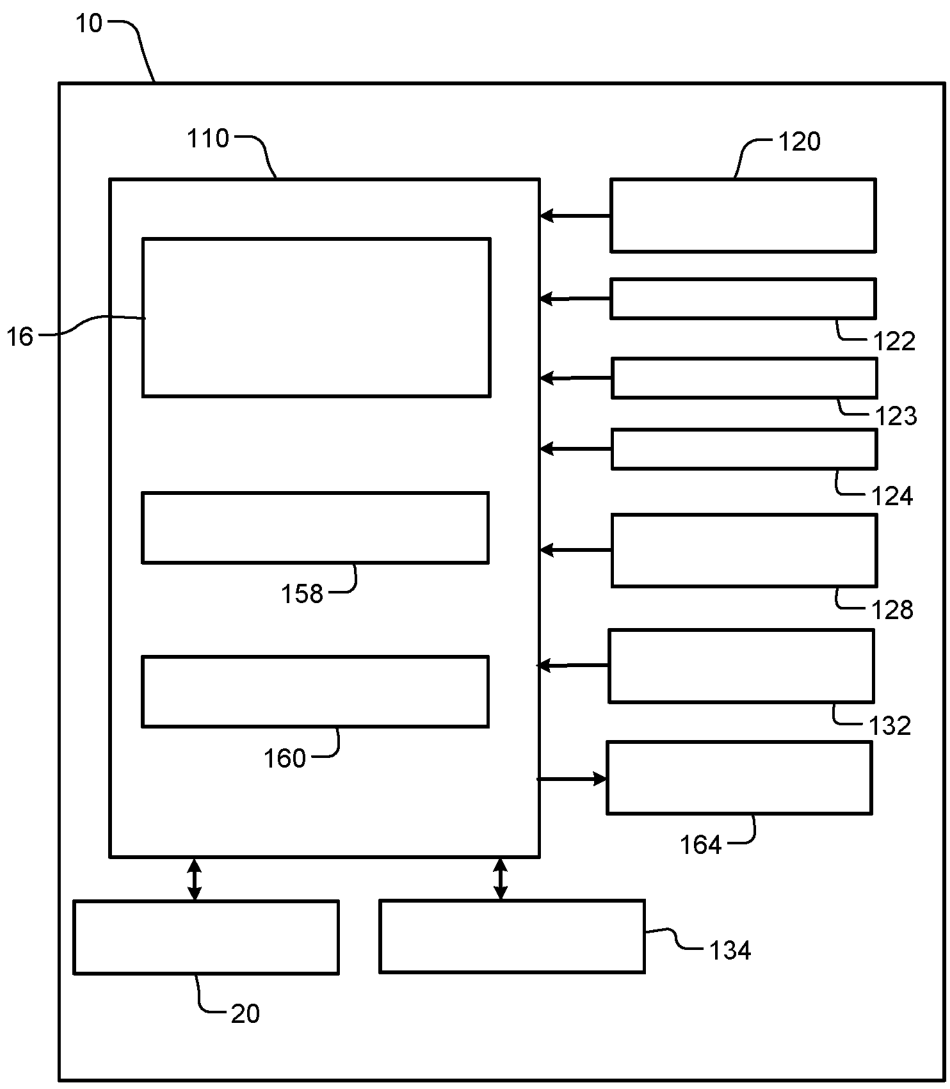
FIG. 1B is a functional block diagram of an example of a vehicle including a steering control module configured to prevent side collisions according to the present disclosure.

Referring now to FIG. 1B, the vehicle 10 includes a controller 110 that communicates with a global positioning system (GPS)/compass 120. The vehicle 10 may include one or more other sensors such as a radar sensor 122, a lidar sensor 124, an ultrasound sensor 123, one or more cameras 128, and/or other types of sensors 132. In some examples, the vehicle 10 includes a gear selector 134 to select park (P), neutral (N), reverse (R), drive (D), or low (L)).

The vehicle 10 includes the steering input device 20 and vehicle control devices 164 such as an accelerator pedal, brake pedal, and/or other control devices. The controller 110 includes the steering control module 16, an image and sensor processing module 158, and/or an autonomous driving module 160. The image and sensor processing module 158 is configured to receive outputs of the radar sensor 122, the lidar sensor 124, the ultrasound sensor 123, one or more cameras 128, and/or other sensors 132 and to determine various parameters described further below.

Figure 2:
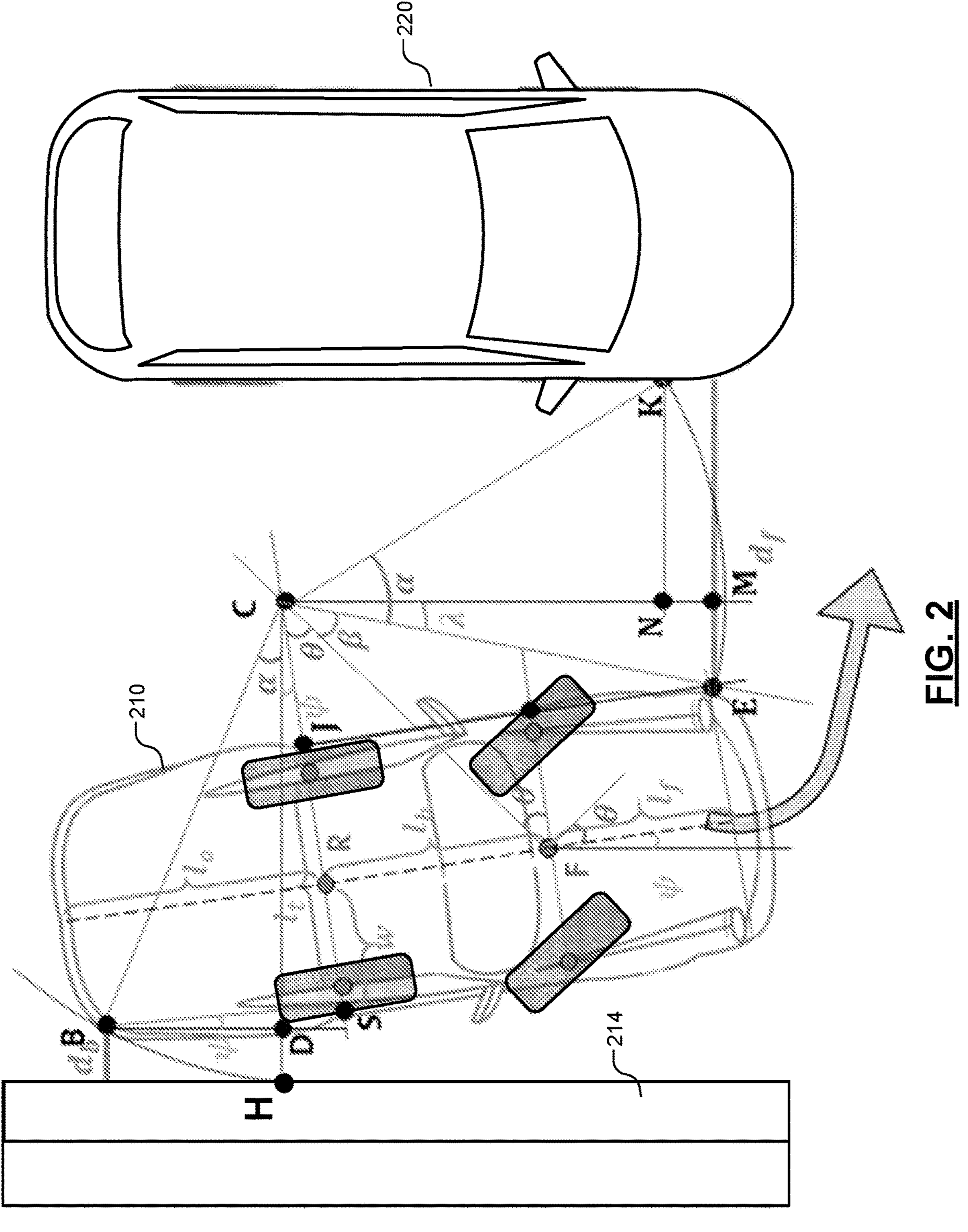
FIG. 2 is a plan view of examples of various measured, calculated, and/or known parameters of a vehicle moving in a forward direction according to the present disclosure.

Referring now to FIG. 2, a vehicle 210 is shown relative to obstacles such as another vehicle 220 and/or another obstacle 214 such as a wall or curb. In FIG. 2, $l_o$ corresponds to a length of a rear overhang, $l_r$ corresponds to a length of a wheel track, $l_b$ corresponds to a length of a wheelbase, and w corresponds to a width. $d_b$ corresponds to a distance of a back corner of the vehicle 210 to the obstacle 214, and $d_f$ corresponds to a distance of the front corner to an obstacle. $d_b$ and $d_f$ are determined by sensors of the vehicle 210 such as cameras or ultrasonic sensors.

Points R and F correspond to centers of rear and front axles. C corresponds to a center of rotation of the vehicle 210. S correspond to a side point on the rear axle. B and E correspond to back and front corners of the vehicle. H corresponds to a back corner of the vehicle 210 near the obstacle 214. D is a location on the vehicle perpendicular to $\overline{CH}$. θ is a road wheel angle. In some examples, θ is mechanically limited to a predetermined angle range (e.g., +/−40°). ψ is a heading angle. In some examples, ψ is determined by the vehicle sensors such as radar sensors and/or cameras. The remaining variables are intermediate variables that are not part of the final equations that are used to sense and prevent a side collision.

In a first scenario involving forward driving, the relationship between the distance $d_b$ to the back corner to the of the obstacle and the road wheel angle are shown by equations (1) to (11) below:

$$d_b = \overline{CH} - \overline{CD} \tag{1}$$

$$\overline{CD} = \overline{BC} \times \cos\alpha \tag{2}$$

$$\overline{BC} = \sqrt{\overline{BS}^2 + \overline{CS}^2} \tag{3}$$

$$\overline{BS} = l_o \tag{4}$$

$$\overline{CS} = \overline{CR} + \overline{RS} = \frac{l_b}{\tan\theta} + w \tag{5}$$

$$\overline{BC} = \sqrt{l_o^2 + \left(\frac{l_b}{\tan\theta} + w\right)^2} \tag{6}$$

$$\sin(\alpha + \psi) = \frac{\overline{BS}}{\overline{BC}} \rightarrow \alpha = \sin^{-1}\left(\frac{l_o}{\sqrt{l_o^2 + \left(\frac{l_b}{\tan\theta} + w\right)^2}}\right) \tag{7}$$

From (2), (6), and (7):

$$\overline{CD} = \sqrt{l_o^2 + \left(\frac{l_b}{\tan\theta} + w\right)^2} \times \cos\left(\sin^{-1}\left(\frac{l_o}{\sqrt{l_o^2 + \left(\frac{l_b}{\tan\theta} + w\right)^2}}\right) - \psi\right) \tag{8}$$

$$\overline{CH} = \overline{BC} = \text{radius of circle} \tag{9}$$

From (6) and (9):

$$\overline{CH} = \sqrt{l_o^2 + \left(\frac{l_b}{\tan\theta} + w\right)^2} \tag{10}$$

$$d_b = \sqrt{l_o^2 + \left(\frac{l_b}{\tan\theta} + w\right)^2} - \left(\sqrt{l_o^2 + \left(\frac{l_b}{\tan\theta} + w\right)^2} \times \cos\left(\sin^{-1}\left(\frac{l_o}{\sqrt{l_o^2 + \left(\frac{l_b}{\tan\theta} + w\right)^2}}\right) - \psi\right)\right) \tag{11}$$

The relationship between the distance $d_f$ from the front corner to the obstacle and the road wheel angle are defined by equations (12) to (20) as follows:

$$d_f = \overline{EM} + \overline{NK} \tag{12}$$

$$\overline{EM} = \overline{CE} \times \sin\lambda \tag{13}$$

$$\lambda = 90 - (\theta + \beta + \psi) \tag{14}$$

$$\tan(\theta + \beta) = \frac{l_b + l_f}{\overline{CJ}} \rightarrow \beta = \tan^{-1}\left(\frac{l_b + l_f}{\overline{CJ}}\right) - \theta \tag{15}$$

$$\overline{CE} = \sqrt{\overline{CJ}^2 + \overline{JE}^2} = \sqrt{\left(\frac{l_b}{\tan\theta} - w\right)^2 + (l_b + l_f)^2} \tag{16}$$

From (13), (14), (15), and (16):

$$\overline{EM} = \sqrt{\left(\frac{l_b}{\tan\theta} - w\right)^2 + (l_b + l_f)^2} \times \sin\left(90 - \tan^{-1}\left(\frac{l_b + l_f}{\frac{l_b}{\tan\theta - w}}\right) - \psi\right) \tag{17}$$

-continued $$\overline{CK}=\overline{CE} \tag{18}$$

$$\overline{NK}=\overline{CK}\times\sin(\alpha-\lambda)=\sqrt{\left(\frac{I_b}{\tan\theta}-w\right)^2+(l_b+l_f)^2}\times \sin\left(\sin^{-1}\left(\frac{l_o}{\sqrt{l_o^2+\left(\frac{I_b}{\tan\theta}+w\right)^2}}\right)-90+\tan^{-1}\left(\frac{l_b+l_f}{\frac{I_b}{\tan\theta}-w}\right)\right) \tag{19}$$

$$d_f=\sqrt{\left(\frac{I_b}{\tan\theta}-w\right)^2+(l_b+l_f)^2}\times\sin\left(90-\tan^{-1}\left(\frac{l_b+l_f}{\frac{I_b}{\tan\theta}-w}\right)-\psi\right)+\sqrt{\left(\frac{I_b}{\tan\theta}-w\right)^2+(l_b+l_f)^2}\times \sin\left(\sin^{-1}\left(\frac{l_o}{\sqrt{l_o^2+\left(\frac{I_b}{\tan\theta}+w\right)^2}}\right)-90+\tan^{-1}\left(\frac{l_b+l_f}{\frac{I_b}{\tan\theta}-w}\right)\right) \tag{20}$$

By solving equations (11) and (20) for θ with given values of $d_b$, $d_f$, and ψ, two possible maximum allowable values are calculated for θ. The minimum value of the two possible maximum allowable values for θ is selected for the commanded road wheel angle for forward driving.

Figure 3:
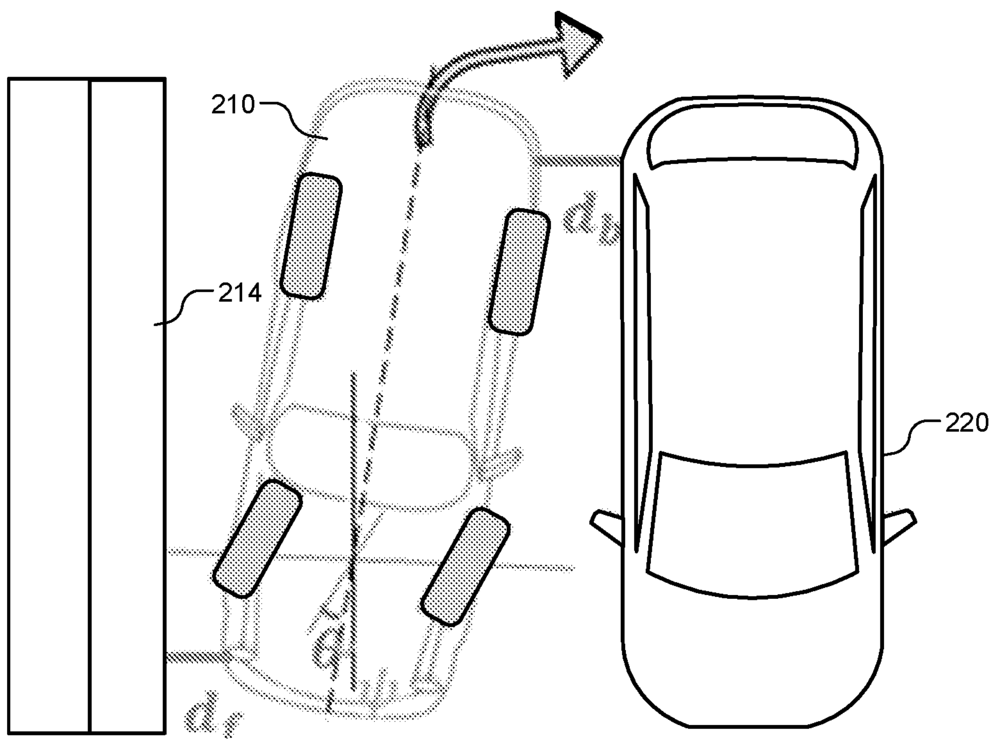
FIG. 3 is a plan view of examples of various measured, calculated, and/or known parameters of a vehicle moving in a rearward direction according to the present disclosure.

In a second scenario involving reversing the vehicle as shown in FIG. 3, a relationship between the distance $d_f$ (between the front corner of the vehicle and the obstacle) and the road wheel angle θ is calculated. In this example, $l_o$ in equation (11) is replaced by $l_f+l_b$, resulting in equation (21):

$$d_f=\sqrt{(l_b+l_f)^2+\left(\frac{I_b}{\tan\theta}+w\right)^2}\times\left[1-\cos\left(\sin^{-1}\left(\left(\frac{l_b+l_f}{\sqrt{(l_b+l_f)^2+\left(\frac{I_b}{\tan\theta}+w\right)^2}}\right)\right)-\psi\right)\right] \tag{21}$$

A relationship between the distance $d_f$ (between the back corner of the vehicle and the obstacle) and the road wheel angle θ is calculated. In this example, $l_o$ in equation (12) is replaced by $l_f+l_b$ resulting in equation (22):

$$d_b=\sqrt{\left(\frac{I_b}{\tan\theta}-w\right)^2+l_o^2}\times \sin\left(90-\tan^{-1}\left(\left(\frac{l_o}{\frac{I_b}{\tan\theta}-w}\right)\right)-\psi\right)+\sqrt{\left(\frac{I_b}{\tan\theta}-w\right)^2+l_o^2}\times \sin\left(\sin^{-1}\left(\frac{l_o}{\sqrt{l_o^2+\left(\frac{I_b}{\tan\theta}+w\right)^2}}\right)-90+\tan^{-1}\left(\frac{l_o}{\frac{I_b}{\tan\theta}-w}\right)\right) \tag{22}$$

By solving equations (21) and (22) for θ with given values of $d_b$, $d_f$, and ψ, two possible maximum allowable values are calculated for θ. The minimum value of the two possible maximum allowable values for θ is selected as the commanded road wheel angle for forward driving.

Figure 4:
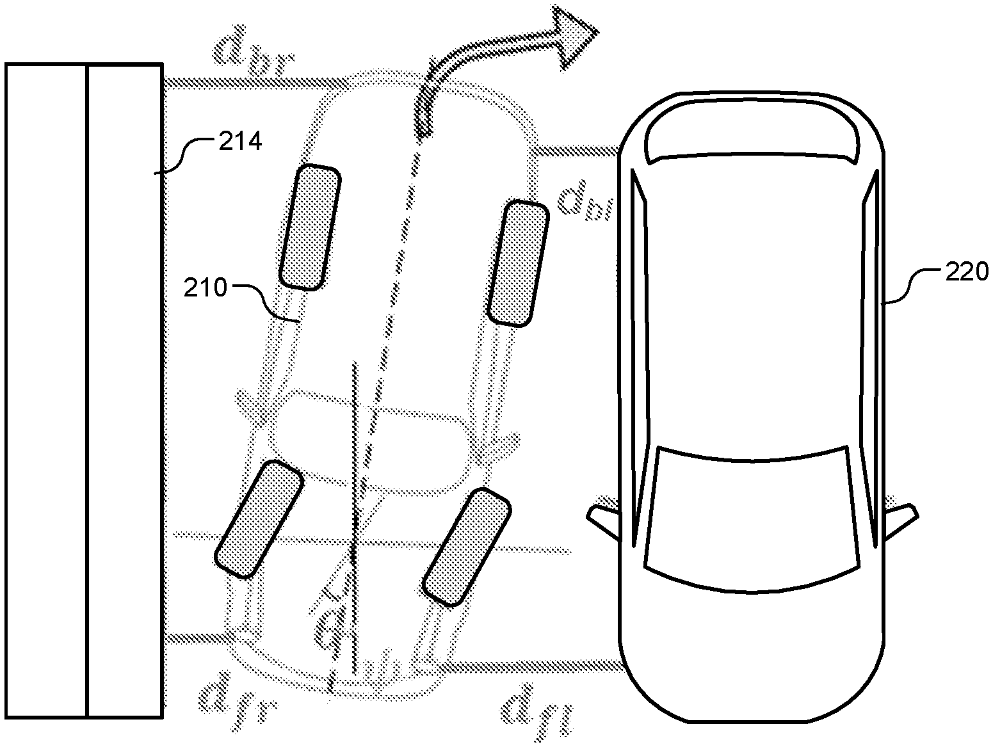
FIG. 4 is a plan view of examples of various measured, calculated, and/or known parameters of a vehicle that is parked according to the present disclosure.

In a third scenario when the vehicle is stationary (e.g., the driver has not selected a forward or reverse driving mode) as shown in FIG. 4, equations (11), (20), (21), and (22) are calculated using $d_{br}$, $d_{bl}$, $d_{fl}$, $d_{fr}$, and ψ to provide four possible values for θ. The minimum of the four values is selected as the maximum angle as an initial input for the commanded road wheel angle for driving. Once the driver selects the driving mode, the maximum angle is adjusted on the selected direction (e.g., forward or reverse).

Figure 5:
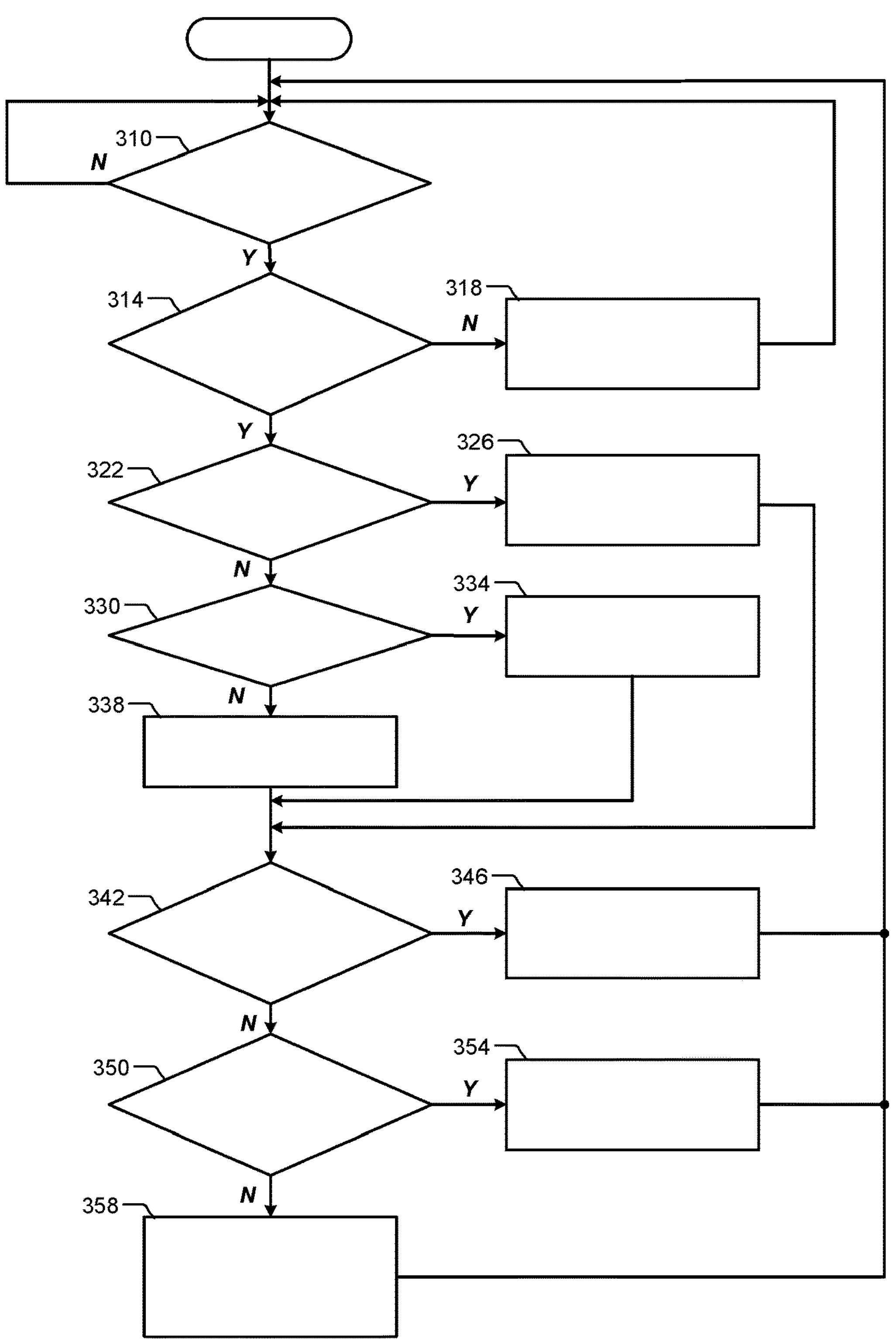
FIGS. 5 to 8 are flowcharts of an example of a method for controlling steering of a vehicle according to the present disclosure.

Referring now to FIG. 5, a method for controlling steering for a steer-by-wire steering system is shown. At 310, the method determines whether the vehicle speed is less than a predetermined vehicle speed threshold $Th_{speed}$ (e.g., 5 miles per hour (mph), 10 mph, etc.). If 310 is false, the method returns. If 310 is true, the method determines whether sensory distance and heading angles are available at 314. If 314 is false, the method notifies the driver that the obstacle avoidance feature is unavailable and the method returns. If 314 is true, the method determines whether the gear selector is in park (P) or neutral (N). If 322 is true, the method determines $\theta_{max}$ for scenario 3 at 326 (as described above and in FIG. 8). If 322 is false, the method continues with 330 and determines whether the gear selector is in reverse (R). If 330 is true, the method continues with 334 and determines $\theta_{max}$ for scenario 2 at 334 (as described above and in FIG. 7). If 330 is false, the method determines $\theta_{max}$ for scenario 1 at 338 (as described above and in FIG. 6). Control continues from 326, 334, or 338 with 342. At 342, the method determines whether the absolute value of a difference between $\Theta_{max}-\Theta_{max\_allow}$ is less than a predetermined collision angle $E_{collision}$.

If 342 is true, a first remedial action is performed at 346 by setting $\Theta_{max}-\Theta_{max\_allow}$. If 342 is false, then the method determines whether $E_{collision}<\text{Abs}\ (\Theta_{max}-\Theta_{max\_allow})<E_{driver\_assist}$ at 350. If 350 is true, the method performs a second remedial action at 354 including actively adjusting the steering ratio (e.g., lowering). If 350 is false, the method performed a third remedial action by notifying the driver about the obstacle and/or requesting action at 358.

Figure 6:
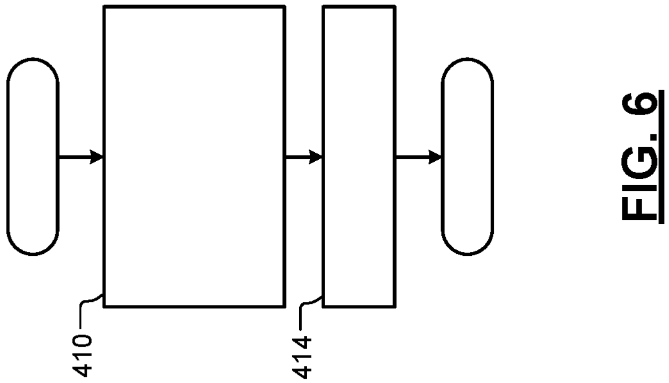

Referring now to FIG. 6, an example determination of $\Theta_{max}$ for scenario 1 (step 338) is shown. At 410, the method calculates the maximum road wheel angle $\Theta_{max}$ by solving equations (11) and (20) for θ with given values of $d_b$, $d_f$, and ψ. At 414, the method selects the smallest angle from equations (11) and (20) as $\Theta_{max\_allow}$.

Figure 7:
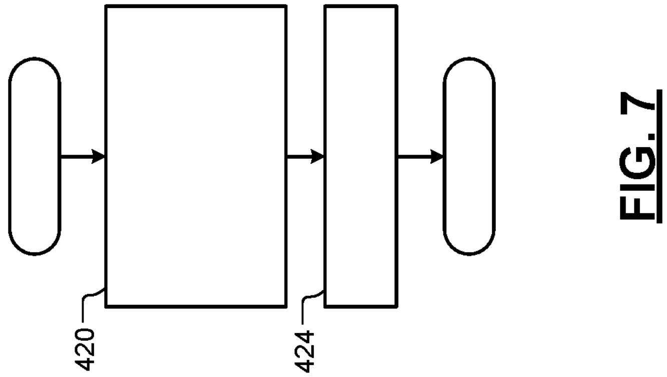

Referring now to FIG. 7, an example of determination of $\Theta_{max}$ for scenario 2 (step 334) is shown. At 420, the method calculates the maximum road wheel angle $\Theta_{max}$ by solving equations (21) and (22) for θ with given values of $d_b$, $d_f$, and ψ. At 424, the method selects the smallest angle from equations (21) and (22) as $\Theta_{max\_allow}$.

Figure 8:
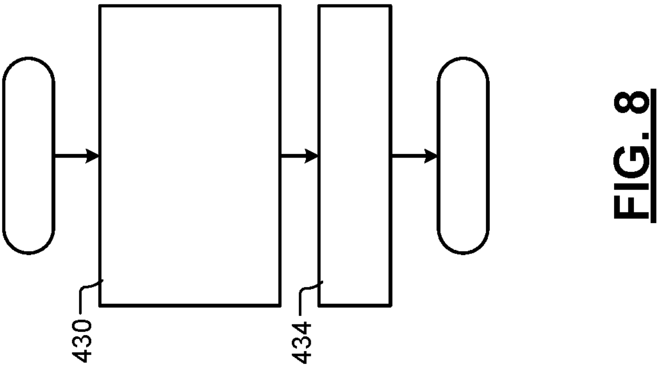

Referring now to FIG. 8, an example of determination of $\Theta_{max}$ for scenario 3 (step 326) is shown. At 430, the method calculates the maximum road wheel angle $\Theta_{max}$ by solving equations (11), (20), (21), and (22) for θ with given values of $d_{br}$, $d_{bl}$, $d_{fl}$, $d_{fr}$, and ψ. At 434, the method selects the smallest angle from equations (11), (20), (21), and (22) as $\Theta_{max\_allow}$.

Figure 9A:
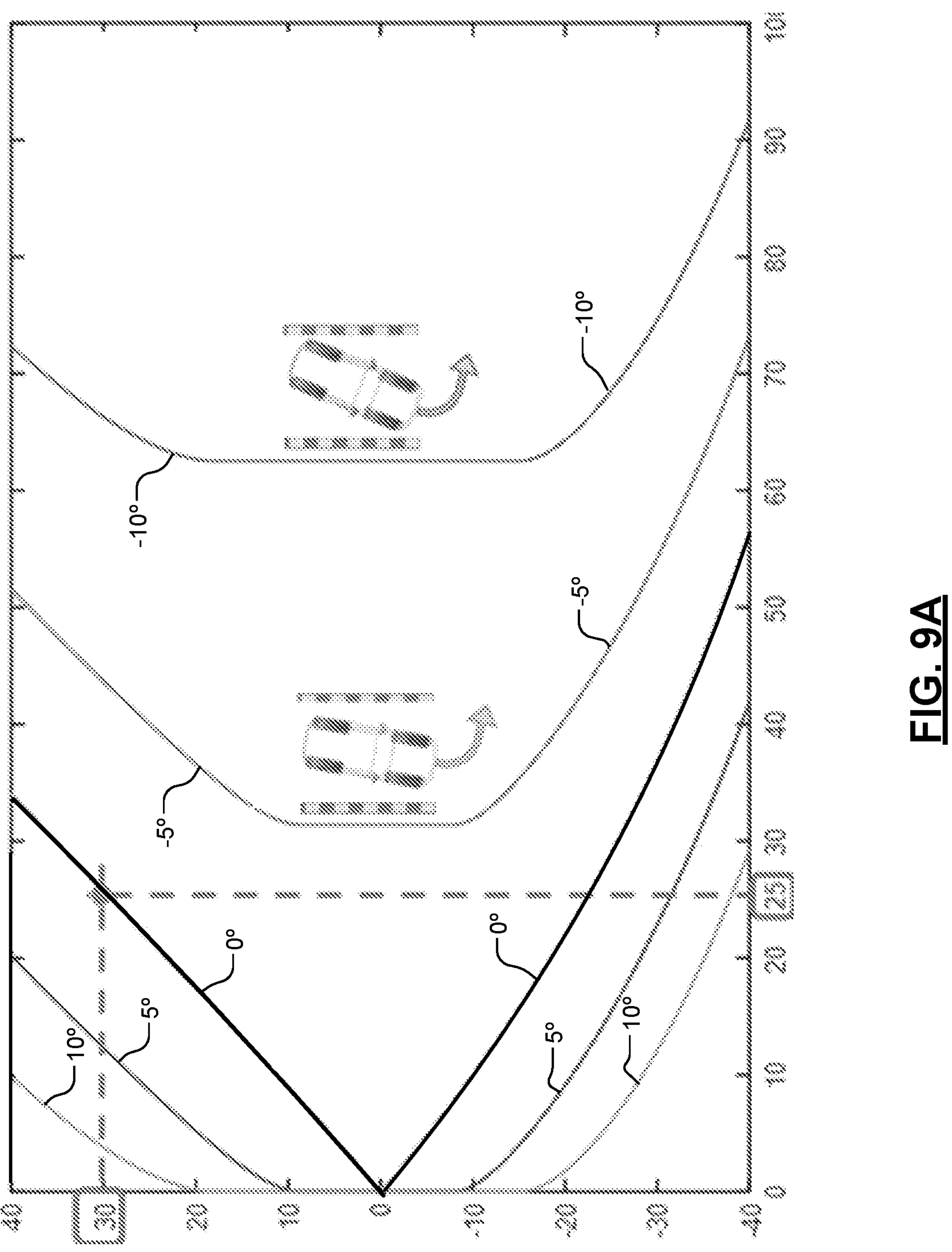
FIG. 9A is a graph of a maximum road wheel angle as a function of heading angle and distance from a back corner of the vehicle to an obstacle according to the present disclosure.
Figure 9B:
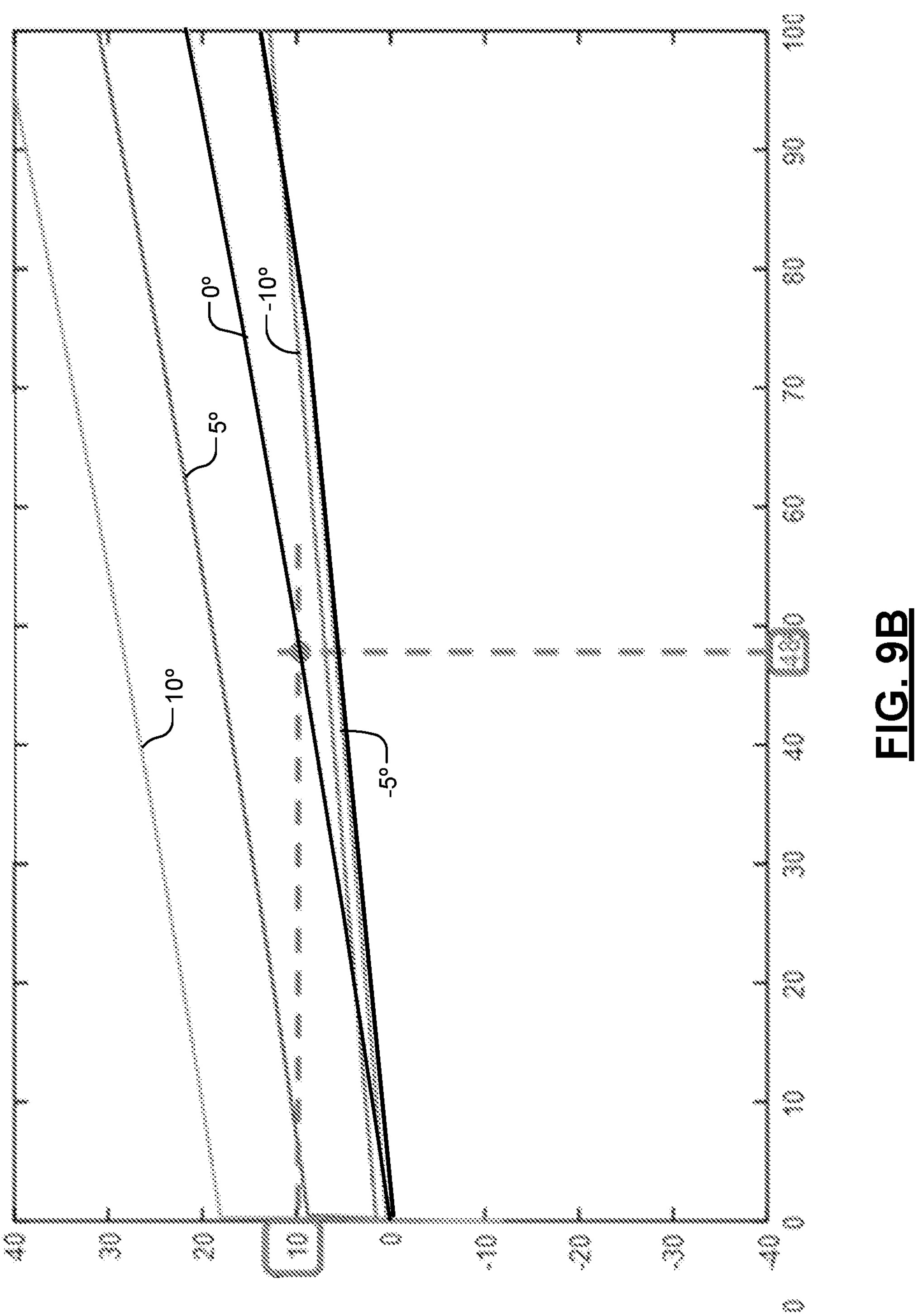
FIG. 9B is a graph of a maximum road wheel angle as a function of heading angle and distance from a front corner of the vehicle to an obstacle according to the present disclosure.

Referring now to FIGS. 9A and 9B, an example is shown for scenario 1 or forward driving. The distance $d_f$ to the obstacle using the sensory distance is 25 cm and the maximum allowable road wheel angle is 30°. Considering the distance $d_f$ from the front corner to the obstacle is 48 cm, the maximum allowable road wheel angle is 10°. Therefore, the maximum angle that can be commanded to the road wheel is 10°.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A steering system for a vehicle, comprising:

a steering input device configured to control a steering angle;

a gear selector;

front wheels positioned at a road wheel angle;

a plurality of sensors;

a processing module configured to determine one or more distances between the vehicle and one or more obstacles in response to the plurality of sensors;

a driver assistance module configured to generate a predetermined collision angle; and a controller including a steering control module configured to:

when the gear selector is in forward:

determine a first maximum road wheel angle using a first equation and a second maximum road wheel angle using a second equation based on the one or more distances;

set a maximum allowable road wheel angle to a smallest angle of the first maximum road wheel angle and the second maximum road wheel angle; and selectively perform a remedial action in response to the steering angle, the maximum allowable road wheel angle, and the predetermined collision angle.

2. The steering system of claim 1, wherein the controller is configured to:

when the gear selector is in reverse:

determine a third maximum road wheel angle using a third equation and a fourth maximum road wheel angle using a fourth equation based on the one or more distances; and set a maximum allowable road wheel angle to a smallest angle of the third maximum road wheel angle and the fourth maximum road wheel angle.

3. The steering system of claim 2, wherein the third equation and fourth equation, respectively, are as follows:

$$d_f = \sqrt{(l_b + l_f)^2 + \left(\frac{I_b}{\tan\theta} + w\right)^2} \times \left[1 - \cos\left(\sin^{-1}\left(\left(\frac{l_b + l_f}{\sqrt{(l_b + l_f)^2 + \left(\frac{I_b}{\tan\theta} + w\right)^2}}\right) - \psi\right)\right]$$

$$d_b = \sqrt{\left(\frac{I_b}{\tan\theta} - w\right)^2 + l_o^2} \times \sin\left(90 - \tan^{-1}\left(\frac{l_o}{\frac{I_b}{\tan\theta} - w}\right) - \psi\right) + \sqrt{\left(\frac{I_b}{\tan\theta} - \right.} \times \sin\left(\sin^{-1}\left(\frac{l_o}{\sqrt{l_o^2 + \left(\frac{I_b}{\tan\theta} + w\right)^2}}\right) - 90 + \tan^{-1}\left(\frac{l_o}{\frac{I_b}{\tan\theta} - w}\right)\right)$$

wherein $d_b$ is a distance from a back corner of the vehicle to a first obstacle, $d_f$ is a distance from a front corner of the vehicle to a second obstacle, $l_b$ is length of a wheelbase, $l_f$ is length of a wheel track, w is one half of a rear track width, and ψ is a heading angle.

4. The steering system of claim 1, wherein the steering input device is physically connected to the front wheels of the vehicle.

5. The steering system of claim 1, wherein the steering input device is not physically connected to the front wheels of the vehicle.

6. The steering system of claim 5, further comprising a road wheel actuator configured to adjust the road wheel angle of the front wheels of the vehicle in response to the steering control module.

7. The steering system of claim 6, wherein the driver assistance module is further configured to generate a driver assistance angle.

8. The steering system of claim 7, wherein the remedial action includes a first remedial action performed when an absolute value of a difference between the steering angle and the maximum allowable road wheel angle is less than or equal to the predetermined collision angle.

9. The steering system of claim 8, wherein the first remedial action includes setting the road wheel angle equal to the maximum allowable road wheel angle.

10. The steering system of claim 7, wherein the remedial action includes a second remedial action performed when an absolute value of a difference between the steering angle and the maximum allowable road wheel angle is greater than the predetermined collision angle and less than a driver assist angle.

11. The steering system of claim 10, wherein the second remedial action includes lowering a steering ratio of the steering input device.

12. The steering system of claim 1, wherein the first equation and second equation, respectively, are as follows:

$$d_b = \sqrt{l_o^2 + \left(\frac{I_b}{\tan\theta} + w\right)^2} - \left(\sqrt{l_o^2 + \left(\frac{I_b}{\tan\theta} + w\right)^2} \times \cos\left(\sin^{-1}\left(\frac{l_o}{\sqrt{l_o^2 + \left(\frac{I_b}{\tan\theta} + w\right)^2}}\right) - \psi\right)\right)$$

$$d_f = \sqrt{\left(\frac{I_b}{\tan\theta} - w\right)^2 + [\![(I]\!]_b + l_f)^2} \times \sin\left(90 - \tan^{-1}\left(\frac{I_b + l_f}{\frac{I_b}{\tan\theta} - w}\right) - \psi\right) + \sqrt{\left(\frac{I_b}{\tan\theta} - w\right)^2 + [\![(I]\!]_b + l_f)^2} \times \sin\left(\sin^{-1}\left(\frac{l_o}{\sqrt{l_o^2 + \left(\frac{I_b}{\tan\theta} + w\right)^2}}\right) - 90 + \tan^{-1}\left(\frac{I_b + l_f}{\frac{I_b}{\tan\theta} - w}\right)\right)$$

wherein $d_b$ is a distance from a back corner of the vehicle to a first obstacle, $d_f$ is a distance from a front corner of the vehicle to a second obstacle, $l_b$ is length of a wheelbase, $l_f$ is length of a wheel track, ψ is one half of a rear track width, and ψ is a heading angle.

13. The steering system of claim 1, wherein the remedial action includes generating at least one of an audible obstacle warning and a visual obstacle warning.

14. A steering system for a vehicle, comprising:

a steering input device configured to control a steering angle;

a gear selector;

front wheels positioned at a road wheel angle;

a road wheel actuator configured to rotate the front wheels of the vehicle;

a plurality of sensors including at least one of a radar sensor, an ultrasound sensor, a lidar sensor, and a camera generating images;

a sensor and image processing module configured to determine one or more distances between the vehicle and one or more obstacles in response to the plurality of sensors;

a driver assistance system configured to generate a predetermined collision angle and a driver assistance angle; and a controller including a steering control module configured to control the road wheel actuator and to:

when the gear selector is in forward:

determine a first maximum road wheel angle using a first equation and a second maximum road wheel angle using a second equation based on the one or more distances; and set a maximum allowable road wheel angle to a smallest angle of the first maximum road wheel angle and the second maximum road wheel angle based on the one or more distances;

when the gear selector is in reverse:

determine a third maximum road wheel angle using a third equation and a fourth maximum road wheel angle using a fourth equation;

set a maximum allowable road wheel angle to a smallest angle of the third maximum road wheel angle and the fourth maximum road wheel angle; and selectively perform a remedial action in response to the steering angle, the maximum allowable road wheel angle, and the predetermined collision angle.

15. The steering system of claim 14, wherein the remedial action includes setting the road wheel angle equal to the maximum allowable road wheel angle when an absolute value of a difference between the steering angle and the maximum allowable road wheel angle is less than or equal to the predetermined collision angle.

16. The steering system of claim 14, wherein the remedial action includes lowering a steering ratio of the steering input device when an absolute value of a difference between the steering angle and the maximum allowable road wheel angle is greater than the predetermined collision angle and less than a driver assist angle.

17. The steering system of claim 14, wherein the first equation and second equation, respectively, are as follows:

$$d_b = \sqrt{l_o^2 + \left(\frac{I_b}{\tan\theta} + w\right)^2} - \left(\sqrt{l_o^2 + \left(\frac{I_b}{\tan\theta} + w\right)^2} \times \cos\left(\sin^{-1}\left(\frac{l_o}{\sqrt{l_o^2 + \left(\frac{I_b}{\tan\theta} + w\right)^2}}\right) - \psi\right)\right)$$

-continued $$d_f = \sqrt{\left(\frac{I_b}{\tan\theta} - w\right)^2 + [\![(I]\!]_b + l_f\Big)^2} \times \sin\left(90 - \tan^{-1}\left(\frac{I_b + l_f}{\frac{I_b}{\tan\theta} - w}\right) - \psi\right) + \sqrt{\left(\frac{I_b}{\tan\theta} - w\right)^2 + [\![(I]\!]_b + l_f\Big)^2} \times \sin\left(\sin^{-1}\left(\frac{l_o}{\sqrt{l_o^2 + \left(\frac{I_b}{\tan\theta} + w\right)^2}}\right) - 90 + \tan^{-1}\left(\frac{I_b + l_f}{\frac{I_b}{\tan\theta} - w}\right)\right)$$

wherein $d_b$ is a distance from a back corner of the vehicle to a first obstacle, $d_f$ is a distance from a front corner of the vehicle to a second obstacle, $l_b$ is length of a wheelbase, $l_f$ is length of a wheel track, w is one half of a rear track width, and ψ is a heading angle.

18. The steering system of claim 14, wherein the third equation and fourth equation, respectively, are as follows:

$$d_f = \sqrt{(l_b + l_f)^2 + \left(\frac{I_b}{\tan\theta} + w\right)^2} \times \left[1 - \cos\left(\sin^{-1}\left(\left(\frac{l_b + l_f}{\sqrt{(l_b + l_f)^2 + \left(\frac{I_b}{\tan\theta} + w\right)^2}}\right) - \psi\right)\right)\right]$$

$$d_b = \sqrt{\left(\frac{I_b}{\tan\theta} - w\right)^2 + l_o^2} \times \sin\left(90 - \tan^{-1}\left(\frac{l_o}{\frac{I_b}{\tan\theta} - w}\right) - \psi\right) + \sqrt{\left(\frac{I_b}{\tan\theta} - \right.} \times \sin\left(\sin^{-1}\left(\frac{l_o}{\sqrt{l_o^2 + \left(\frac{I_b}{\tan\theta} + w\right)^2}}\right) - 90 + \tan^{-1}\left(\frac{l_o}{\frac{I_b}{\tan\theta} - w}\right)\right)$$

wherein $d_b$ is a distance from a back corner of the vehicle to a first obstacle, $d_f$ is a distance from a front corner of the vehicle to a second obstacle, $l_b$ is length of a wheelbase, $l_f$ is length of a wheel track, w is one half of a rear track width, and ψ is a heading angle.

19. The steering system of claim 14, wherein the remedial action includes generating at least one of an audible obstacle warning and a visual obstacle warning.

20. A vehicle comprising the steering system of claim 14.

* * * * *